United States Patent
Becker et al.

(10) Patent No.: US 10,924,570 B2
(45) Date of Patent: Feb. 16, 2021

(54) NOTIFICATION UPDATES FOR SAVED SITES

(71) Applicant: Microsoft Technology Licensing, LLC, Redmond, WA (US)

(72) Inventors: Steven J. Becker, Bellevue, WA (US); Ali Alabbas, Sammanish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 52 days.

(21) Appl. No.: 15/971,907

(22) Filed: May 4, 2018

(65) Prior Publication Data
US 2019/0342411 A1 Nov. 7, 2019

(51) Int. Cl.
*H04L 29/08* (2006.01)
*H04L 12/58* (2006.01)

(52) U.S. Cl.
CPC .............. *H04L 67/26* (2013.01); *H04L 51/24* (2013.01)

(58) Field of Classification Search
CPC ......... H04L 67/02; H04L 67/26; H04L 29/06; H04L 51/24; H04L 67/146; H04L 67/306; H04L 43/0817; H04L 51/043; H04L 63/08; H04L 67/24; H04L 63/083; H04L 65/1073; H04L 67/18; H04L 67/22; H04L 67/2833; H04L 67/2842; H04L 67/34; H04L 67/42; G06F 17/2247; G06F 3/04817; G06F 8/61; G06F 17/218; G06F 17/2235; G06F 21/00; G06F 21/44; G06F 3/0482; G06F 3/0486; G06F 16/951; G06F 8/60; G06F 8/65; G06F 11/3664; G06F 16/9038; G06F 17/243; G06F 17/30864; G06F 21/10; G06F 21/6227; G06F 21/6263; G06F 21/6272; G06F 21/629; G06F 21/78; G06F 3/04842; G06F 8/30; G06F 8/63; G06F 8/658;
(Continued)

(56) References Cited

U.S. PATENT DOCUMENTS 7,082,397 B2 * 7/2006 Cohen ................... H04M 3/493
379/88.17
8,739,249 B1 * 5/2014 Kay ........................ G06F 21/00
709/217
(Continued)

OTHER PUBLICATIONS

Alabbas, et al., "Service Workers: Going beyond the page", Retrieved from: https://web.archive.org/web/20180319163819/https://blogs.windows.com/msedgedev/2017/12/19/service-workers-going-beyond-page, Dec. 19, 2017, 13 Pages.
(Continued)

*Primary Examiner* — Chris Parry
*Assistant Examiner* — Abderrahmen Chouat

(57) ABSTRACT

In one embodiment, a computer system receives a signal to associate a website with an entity on a user interface. The entity is managed by an operating system running on the computer system. The computer system associates the entity with a push channel that is configured to push updates for the website. The push channel is configured with the entity as an endpoint. An update is received via the push channel at the operating system and the computer system associates the update with the entity by correlating the endpoint of the push channel to the entity. The computer system then causes a notification to be output for the entity on the user interface using the operating system.

20 Claims, 7 Drawing Sheets

(58) Field of Classification Search
CPC ........ G06F 8/71; G06F 9/445; G06F 9/44505; G06F 9/44526; G06F 9/451; G06F 9/452; G06F 9/542; G06Q 10/10; G06Q 30/0201; H04W 4/50; H04W 4/00; H04W 4/021; H04W 4/025; H04W 4/10; H04W 64/00; H04W 68/00
See application file for complete search history.

(56) References Cited

U.S. PATENT DOCUMENTS

| | | | | |
|---|---|---|---|---|
| 2008/0209000 | A1* | 8/2008 | Schmidt | H04N 21/41407 709/207 |
| 2011/0307880 | A1* | 12/2011 | Hilerio | G06F 8/61 717/171 |
| 2012/0260215 | A1* | 10/2012 | Fennel | H04W 4/50 715/825 |
| 2014/0337405 | A1* | 11/2014 | Athas | H04L 67/26 709/203 |
| 2015/0117373 | A1* | 4/2015 | Thies | H04W 72/0493 370/329 |
| 2015/0237151 | A1* | 8/2015 | Lau | G06F 16/951 709/206 |
| 2015/0254726 | A1* | 9/2015 | Cassidy | G06Q 50/12 705/14.58 |
| 2016/0028840 | A1* | 1/2016 | Krishnan | H04W 4/10 709/204 |

OTHER PUBLICATIONS

Beverloo, et al., "Push API", Retrieved from: http://web.archive.org/web/20180321234508/https://www.w3.org/TR/push-api/, Dec. 15, 2017, 27 Pages.

Hume, Dean Alan., "Progressive Web Apps", Published by: Manning Publications Co., Jul. 25, 2017, 217 Pages.

Jacobs, et al., "Windows Push Notification Services (WNS) Overview", Retrieved from: https://web.archive.org/web/20171020190818/https://docs.microsoft.com/en-us/windows/uwp/controls-and-patterns/tiles-and-notifications-windows-push-notification-services-wns-overview, May 19, 2017, 9 Pages.

"International Search Report and Written Opinion Issued in PCT Application No. PCT/US2019/029244", dated Sep. 5, 2019, 16 Pages.

Pflug, et al., "Welcoming Progressive Web Apps to Microsoft Edge and Windows 10", Retrieved from: https://web.archive.org/web/20180306194911/https://blogs.windows.com/msedgedev/2018/02/06/welcoming-progressive-web-apps-edge-windows-10/, Feb. 6, 2018, 24 Pages.

* cited by examiner

NOTIFICATION UPDATES FOR SAVED SITES

BACKGROUND

A user may view a webpage from a website on a web browser. If the user accessed the webpage often, the user may opt to save a link to the webpage or save the webpage as a favorite. When the webpage is saved, some entity may be created, such as an icon shortcut or bookmark menu item, that the user can select to access the webpage. When the entity is selected by the user, the webpage is automatically accessed and displayed. While the saved entity may be useful for accessing the website to display the webpage, over time, the user may use the entity less and possibly forget about the entity.

DETAILED DESCRIPTION

Figure 1:
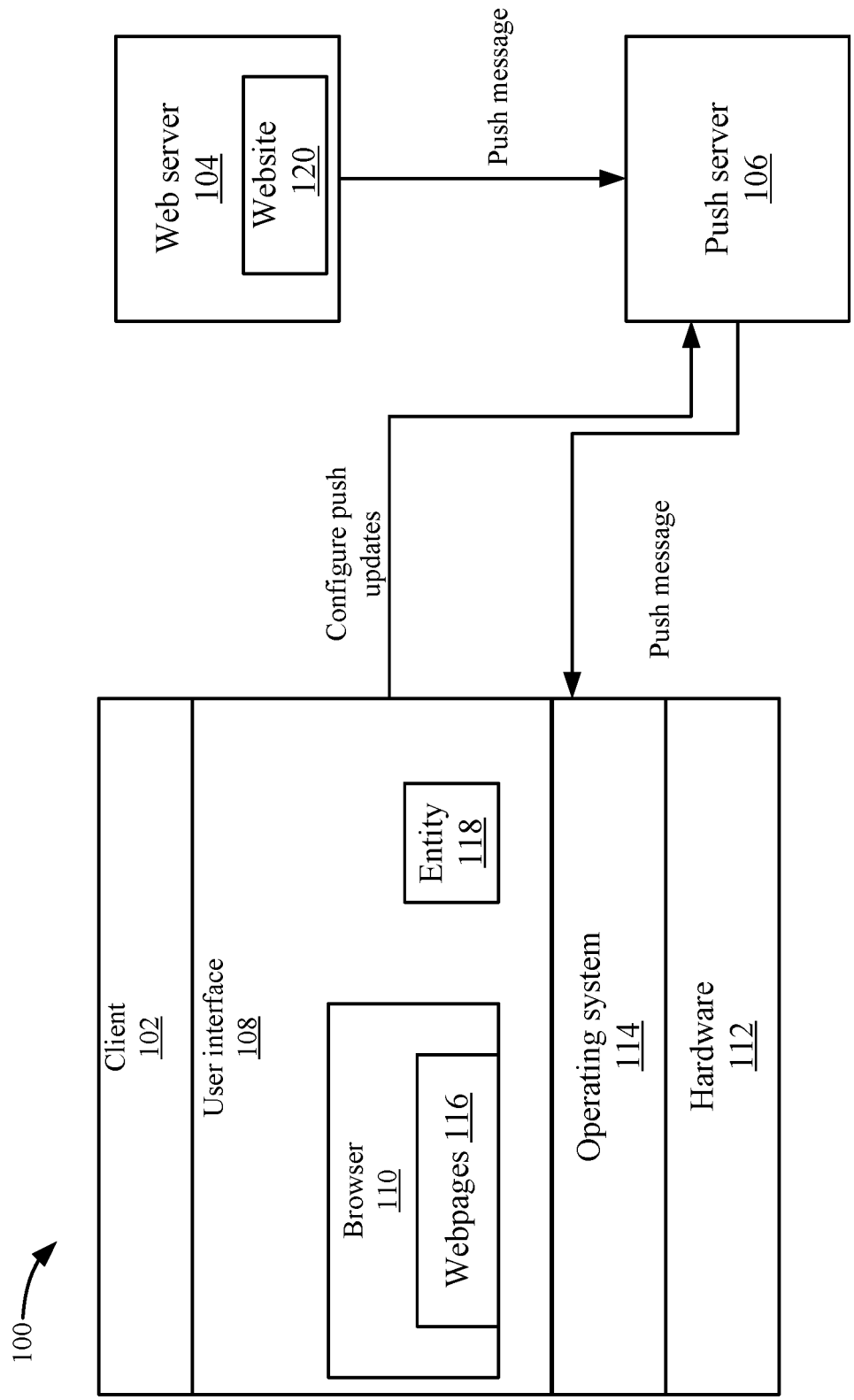
FIG. 1 depicts a simplified system of a method for providing notifications for entities according to some embodiments.

Some embodiments configure notification updates for websites that have been associated with an entity on a user interface of a client. For example, a website may be saved, such as pinned, to a location on the user interface, such as on a task bar, a start menu, the desktop, or another location on the user interface. In some embodiments, a browser web application running on a computing device may pin an icon to the task bar of the user interface. After being saved, in some examples, a selection of the icon may be received and the operating system opens a browser that displays a webpage for the website.

In addition to providing a shortcut to display the website, some embodiments configure notification updates for the entity. For example, the client configures push messages that are used to signal events that occur at the website. In some examples, the operating system may cause information, such as a badge that displays a number, to be displayed for the icon to notify the user of some event that occurred. For example, the operating system displays a badge on the icon that may indicate information from the website, such as a number of unread messages that are available to read on a website. When notification is used, the notification may be a badge, but may also be other information that is displayed.

To enable the notification updates for the entity, the client configures a push channel to push updates for the website. In some embodiments, the client may configure a web server hosting the website to send updates to a push server. The push server then pushes the updates to the client.

The client also associates the entity as an endpoint for the push channel instead of an application. For example, the client associates the icon as the endpoint of the push channel. When an update is received via the push channel, the operating system may determine that the update is for the entity, such as the icon, because the endpoint is the entity. Then, the operating system causes a notification to be output for the entity on the user interface. In some embodiments, the operating system outputs the notification without having to execute any software code from the website or without requiring that the website be open and running on a browser because the endpoint for the push channel is the entity and not an application (e.g., a browser running a website). The website thus does not have to be involved in the process of updating the entity with a notification.

Not requiring the website to be involved in processing the notification may use fewer computing resources because executing the website code (or any application code) is avoided. Rather, some embodiments receive and initially process web push notifications with operating system level background tasks in the operating system of the client. Using an operating system level task to handle push notifications obviates the need for a constantly active web application process to receive and handle an incoming push notification. Some embodiments can therefore significantly improve performance of the client in terms of performance and reliability. This can be especially significant in mobile devices, where battery capacity is a constant concern. For example, eliminating the need for an active web application to handle web push notifications can help to preserve battery life in a mobile device that uses push notifications.

System

FIG. 1 depicts a simplified system 100 of a method for providing notifications for entities according to some embodiments. System 100 includes a client 102, web server 104, and push server 106. A browser 110 may run on operating system 114 and is displayed in user interface 108. Browser 110 may display webpages 116 from a website 120, which may be hosted on web server 104. Web server 104 may be any server that is hosting website 120, and web server 104 may be an entity that is separate from client 102. When the term website is used, the website may be a collection of webpages identified by links (uniform resource locators ((URLs)). When a website is described as being associated with an entity, one or more webpages for the website may be associated with the entity. For example, each webpage with the same origin (e.g., URL of the website) may be associated with the entity. The terms website and webpage may be used interchangeably herein.

In some embodiments, web server 104 can be any entity that provides web-based content and/or web-based services. For example, the web server 104 can host a website, be a web application host, be a mobile application host, be a cloud-based service, and in general can host any web application implemented using web technology.

In some embodiments, web server 104 is configured to provide web push messages (updates) to a push server 104. A web push message is a message initiated by the web server 104 for delivery to browser 110, which is executing on the client device 102. Push server 104 can be any entity that enables the delivery of push messages. The Microsoft® Windows Push Notification Services (WNS) is an example of a web push server.

Browser 110 may be a web application that refers to an application implemented using web technologies that execute within the context of a web runtime environment. The term "web technologies" refers to languages and multimedia packages that are used in conjunction with each other to produce dynamic web sites. Languages for web sites include hypertext mark-up language (HTML), dynamic HTML (DHTML), JavaScript, cascading style sheets (CSS), and the like. Multimedia packages include the Adobe Flash® multimedia platform and the scalable vector graphics (SVG) platform.

Client 102 may be a computing device, such as a laptop computer, personal computer, mobile device, tablet device, etc. In some embodiments, client 102 includes hardware 112, which includes computer processors, storage, etc. Operating system 114 executes on hardware 112 and supports the basic functions of the device, such as scheduling tasks, executing applications, and controlling peripheral devices. Operating system 114 is a process that manages hardware 112 and all the other processes (e.g., applications) executing on client 102.

An underlying communication network (not shown) can provide communication among the web server 104, push server 104, and clients 102. The communication network can comprise any suitable combination of a local area network, wide area network, public switched telephone network, cellular network, and the like.

Entity 118 may be associated with a location on user interface 108. In some embodiments, a user may use browser 110 to associate entity 118 with user interface 108. For example, a menu in browser 110 may provide a command to pin entity 118 to a task bar. In other embodiments, entity 118 may be programmatically associated with user 108 without receiving a user input. For example, webpage 116 may programmatically associate entity 118 with a location on user interface 108. Additionally, entity 118 may be associated with a location on user interface 108 is other ways, such as the user may use an operating system level command to pin entity to the taskbar.

In some embodiments, entity 118 may be associated with a portion of user interface 108 that is being displayed, such as a task bar. The task bar may be a portion of user interface 108 that is dedicated for display of entities. However, other locations of user interface 108 may be used, such as a start menu, any portion of the desktop, in an application, etc. In some embodiments, the task bar permanently displays entities at all times (e.g., windows or other objects cannot obstruct or cover the taskbar). Selection of entities on the taskbar generally cause some action to be performed, such as accessing an associated application for the entity. Also, although a graphical or visual display of entity 118 may be discussed, it will be understood that user interface 108 may be display-less. For example, user interface 108 may be a verbal or speech user interface where a user interacts with user interface 108 via verbal commands. In this example, entity 118 may be saved to user interface 108 in a non-visual way, such as entity 118 may be saved and associated with user interface 108 where a user can direct verbal commands to entity 118.

When entity 118 is created, operating system 114 stores an identifier for entity 118. For example, if entity 118 is a tile or icon, operating system 114 stores the identifier for the tile or icon. The entity's identifier allows operating system 114 to later associate the push channel for the push subscription with entity 118. Operating system 114 may store other information for entity 118, such as the location of entity 118 on user interface 102.

Also, when browser 110 receives an indication to associate website 120 with entity 118, browser 110 may execute software code in a webpage 116 from website 120 to configure push updates for entity 118. For example, browser 110 executes a web application programming interface (API) that is included in code in webpage 116. The API may be compatible with operating system 114 to configure push subscriptions. The association of website 120 with entity 118 may cause client 102 to send a push registration request to create a push subscription for website 120. In some embodiments, client 102 can send a push registration request to web server 104 and/or push server 106 to create the push subscription. In some embodiments, browser 110 may cause client 102 to send a push registration request to push server 106. Alternatively, client 102 may send the registration request to web server 104, which may forward the push registration request received from client 102 to push server 106.

In some embodiments, push server 106 can expose a push channel that is associated with client 102, which web server 104 can use to push messages to push server 106. The push channel specifies an endpoint on client 102 for messages from web server 104. The push channel can identify the particular entity 118 as the endpoint for the push notification using the identifier that was generated for entity 118. The push channel, for example, can be a specific URL or other suitable identifier that identifies client 102 and entity 118. In some embodiments, using the entity 118 as the endpoint allows operating system 114 to process the push messages instead of browser 110 or website 120 as will be discussed below in more detail. Web server 104 can communicate a push subscription that includes the push channel information to client 102.

Once the push channel is configured, website 120 may determine an update for the website has occurred. For example, website 102 may be configured to monitor for changes to certain aspects of all or a portion of webpages 116 that have an origin of the website URL. For example, a new e-mail may be received and available to read on a website for a user. Web server 104 may then push an update to push server 106 for the website. Thereafter, push server 106 pushes the update to client 102 in a push message. In some embodiments, for example, web server 104 can encrypt the push message using the message public key received from the client device 102 during the process of creating the push subscription. Web server 104 can encrypt the encrypted message using its own private key to authenticate web server 104 as the source of the message. Web server 104 can send the doubly-encrypted message along with a push channel that identifies the target (endpoint of entity 118) of the push message to push server 106 in a push request.

Push server 106 can process the push request received from web server 104. In some embodiments, push server 106 can authenticate the received push message to verify the source of the push message to be web server 104. For example, push server 106 can use the web server public key provided to push server 106 during the subscription creation phase. If the received push message is not authenticated, push server 106 can deny the push request. Otherwise, push server 106 can communicate the push message to the client 102, including the push channel to identify the target of the push message. Although the above process of sending the push messages is described, other processes may be used.

Client 102 receives the push message and can process the push message at operating system 114. In some embodiments, operating system 114 can launch a notification handler that can be an OS-level process that executes within the process space of the operating system 114. In some embodiments, operating system 114 can then associate the push channel with entity 118. For example, the endpoint identified by the push message may be correlated to the identifier for entity 118. Operating system 114 can then cause the notification to be output with respect to entity 118. For example, the notification may be displayed on entity 118. In some embodiments, the update may include a payload that indicates the content of the notification. For example, if the user has three unread e-mail messages on website 120, then the payload may indicate a number of "3", which operating system 114 uses to update the badge for entity 118.

Using operating system 114 to update entity 118 uses less computing resources than if the endpoint was an application, such as browser 110. For example, operating system 114 would need to contact browser 110, which is operating at the application level. Also, browser 110 would need to be open to update entity 118. If browser 110 is not open, then entity 118 may not be updated. Also, if website 120 was the endpoint, then the update may not be displayed if a webpage 116 is not opened in browser 110. Alternatively, operating system 114 may have to open browser 110, communicate with web server 104 to retrieve code for webpage 116, and open webpage 116 to cause the notification to be displayed. However, when using operating system level commands to display the notification, operating system 114 does not need to open browser 110 and webpage 116 to display the notification. This uses less battery power and computing resources for client 102.

Notification Configuration

Figure 2:
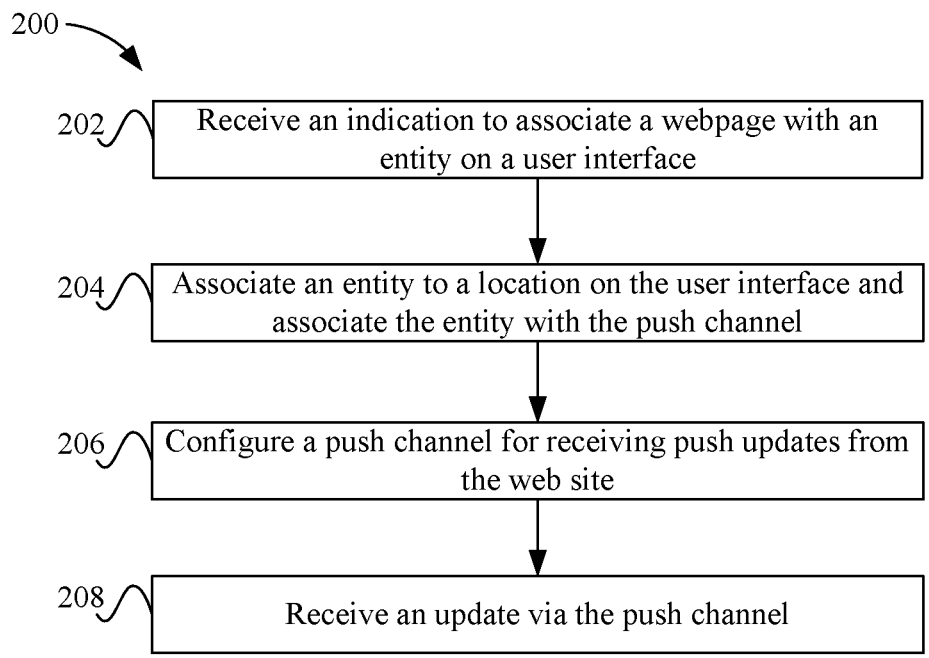
FIG. 2 depicts a simplified flowchart of a method for configuring notifications for entities according to some embodiments.

FIG. 2 depicts a simplified flowchart 200 of a method for configuring notifications for entities 118 according to some embodiments. At 202, browser 110 receives an indication to associate a website 120 with entity 118 on user interface 108. As discussed above, website 120 may be pinned to a location on user interface 108.

At 204, operating system 114 associates an entity 118 to a location on user interface 108. For example, browser 110 executes code in an API that generates entity 118, such as pins an icon to the taskbar. When entity 118 is created, operating system 114 may store an identifier for entity 118. For example, when a website is saved to a location on user interface 108, such as pinned to the taskbar and/or start menu, browser 110 is notified by operating system 114 that entity 118 has been associated with the location, which then fires an event, such as a JavaScript™ event on the webpage of the same origin (e.g., an onpagepinned event) that allows the website to then check for pinned webpages (e.g., using the getTiles( ) JavaScript™ API that enumerates all taskbar Tiles for the origin). In some embodiments, a tile is a representation of an entity 118 in user interface 108. In this context, the getTiles API retrieves the metadata of the tile, which includes the URL of the saved website as well as a JavaScript™ interface that can be used to establish a push subscription. Then, the website can subscribe for a push channel for entity 118 by passing a public key into the subscribe JavaScript function, which uses operating system application programming interfaces (APIs) that create and associate a push channel for that entity 118 (tracked via stored a data structure).

At 206, browser 110 configures a push channel for receiving push updates from website 120. For example, browser 110 executes code for an API to configure the push subscription for website 120 with an endpoint of entity 118. Web server 104 is then configured to send updates to push server 106, which sends the updates via a push channel to client 102.

At 208, operating system 114 receives an update via the push channel. For example, website 120 may determine an update to webpage 116 and send a push message with the update to push server 106. Push server 106 then sends the push message with the update to client 102.

Push Message Processing

Figure 3:
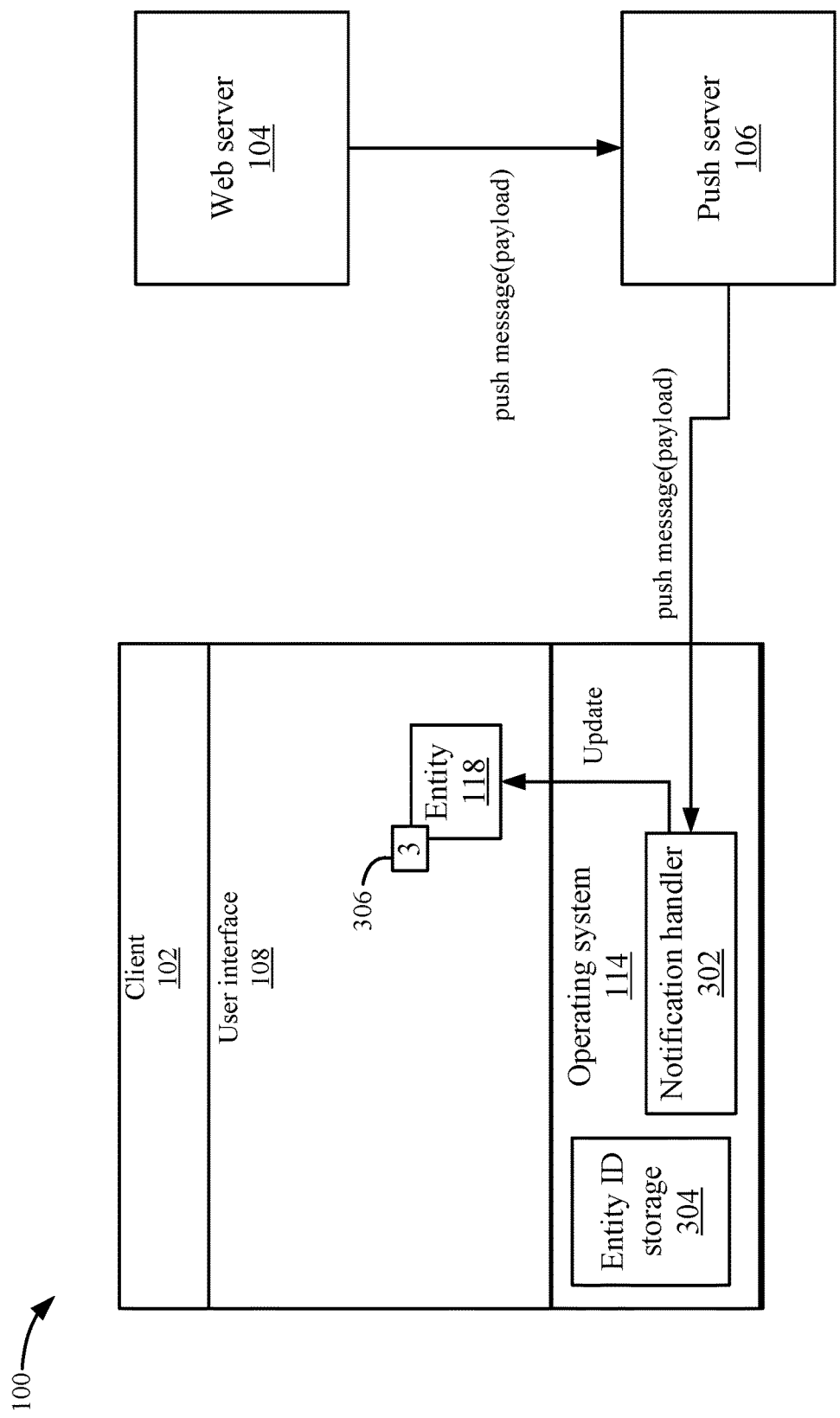
FIG. 3 depicts a more detailed example of updating a notification for an entity according to some embodiments.

FIG. 3 depicts a more detailed example of updating a notification for entity 118 according to some embodiments. Web server 104 sends a push message with an update as a payload to push server 106. Push server 106 is then configured to send the push message via a push channel to client 102. In some embodiments, the endpoint of the push message is an identifier for entity 118. Also, the push message includes a payload that indicates information for the update.

A notification handler 302 may process the push message. In some embodiments, notification handler 302 is running at the operating system level in operating system 114. Notification handler 302 may retrieve the identifier for the endpoint and the payload from the push message. Notification handler 302 then uses entity ID storage 304 to determine which entity 118 is associated with the identifier. For example, entity ID storage 304 may have stored entity identifiers for each entity 118 being displayed on user interface 102. In some embodiments, entity ID storage 304 may store tile or icon identifiers for each entity 118. Other information may be stored, such as the location of entity 118 on user interface 108.

Once determining the entity associated with the push message, notification handler 302 can then update entity 118 using the payload. In some examples, the payload may indicate a number, which notification handler 302 uses to update the badge 206 for entity 118. For example, at 306, notification handler 302 has caused an update to a badge for entity 118 using the payload. For example, the number "3" is displayed.

Figure 4:
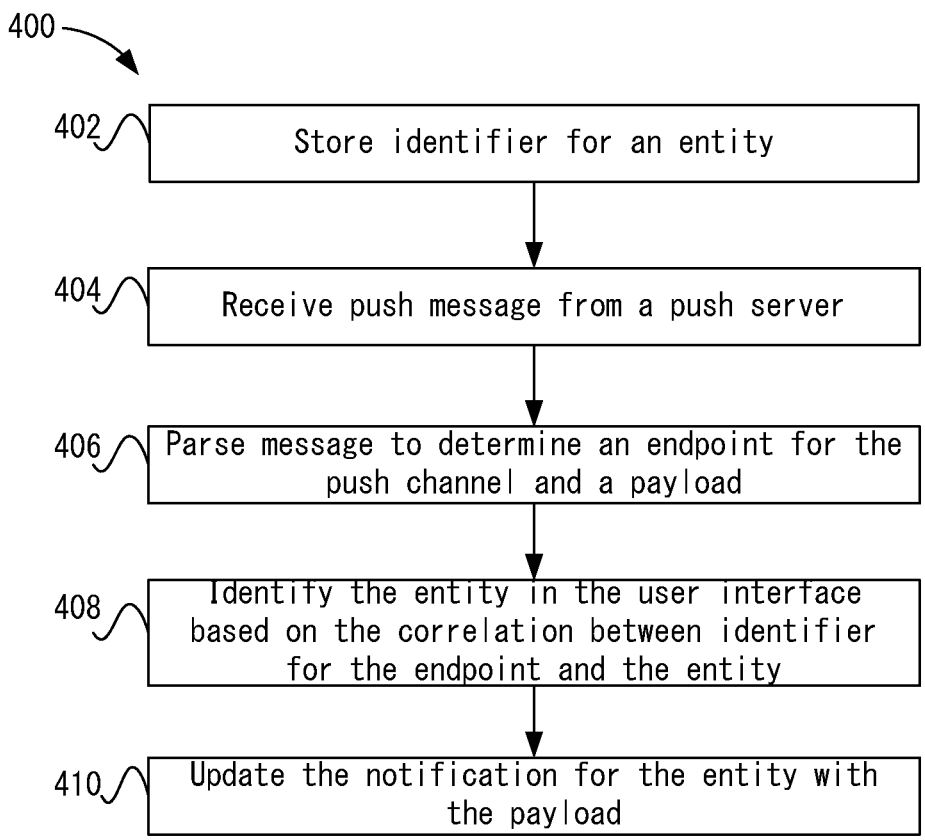
FIG. 4 depicts a simplified flowchart of a method for processing a push message according to some embodiments.

FIG. 4 depicts a simplified flowchart 400 of a method for processing a push message according to some embodiments. At 402, operating system 114 stores an identifier for entity 118. As discussed above, operating system 114 may store the identifier in entity ID storage 304.

At 404, operating system 114 receives the push message from push server 106. At 406, operating system 114 parses the push message to determine an endpoint for the push channel and a payload. The endpoint may be an identifier for entity 118 that may have been established during registration and is associated with any push messages in the push channel. The payload may be a number or other information that can be used to determine the content for the notification.

At 408, operating system 114 identifies the entity in user interface 108 based on the correlation between the endpoint identifier and entity 118. As discussed above, the identifier for the endpoint identifies entity 118.

At 410, operating system 114 updates a notification of the entity with the payload. For example, operating system 114 may update a badge number based on the payload. If the badge is not already displayed, operating system 114 displays a badge with a number determined based on the payload. For example, a number "1" may be displayed on entity 118. If a badge is already displayed, operating system 114 may update the badge, such as by incrementing the number based on the payload.

Other Implementations

Figure 5:
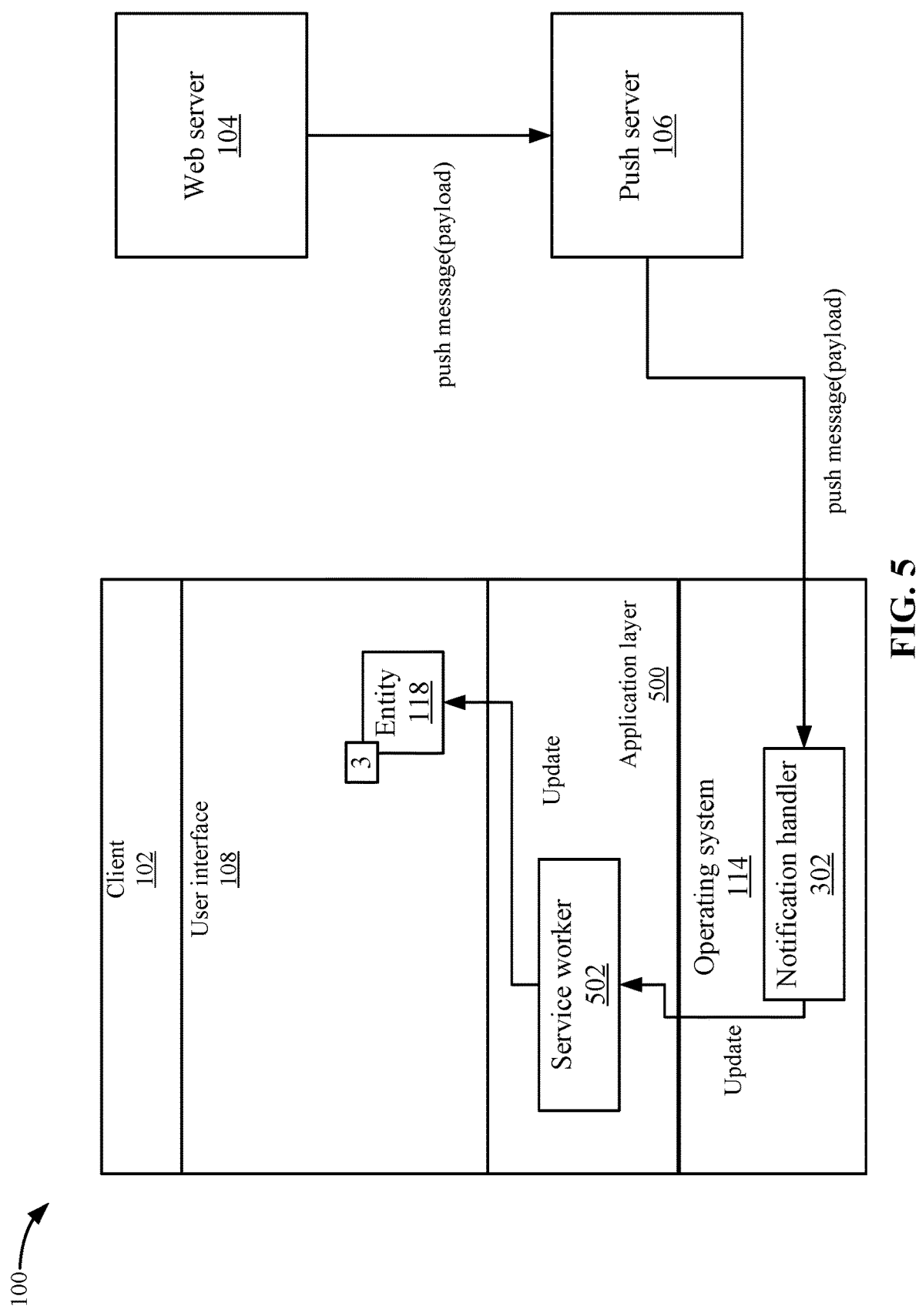
FIG. 5 depicts an example of using service workers to perform the updates according to some embodiments.

Although operating system 114 is discussed as being used to update entity 118, other implementations may be used. FIG. 5 depicts an example of using service workers 502 to perform the updates according to some embodiments. When notification handler 302 receives an update, notification handler 302 may send the update to a service worker 502. Service worker 502 is running in an application layer 500 on top of operating system 114. A service worker process can execute event-driven code independently of website 120, and can be used to perform functions such as handling push messages, background sync operations, geofencing, and the like. Browser 110 can launch a service worker 502 to handle a push message when entity 118 is created. In some embodiments, service worker 502 can be a child process that executes in the process space of browser 110. In other embodiments, the service worker 502 can run as a thread in the same process as browser 110 or in a child process of browser 110. Or, service worker 502 can run in the background. Service worker 502 can execute a service worker script (e.g., a JavaScript written by a web developer) to perform the desired functionality.

Service worker 502 may run a script that programmatically can update the notification for entity 118. Accordingly, operating system 114 may not automatically update the notification. The update may be performed when web site 120 is open in browser 110 or not opened because service worker 502 may be running in the background and is not dependent on browser 110 being open. When operating system 114 receives the push message, operating system 114 determines the endpoint is entity 118. However, instead of updating entity 118, operating system 114 sends the update to service worker 502. Then, service worker 502 can push the notification to entity 118 with or without browser 110 being open.

Figure 6:
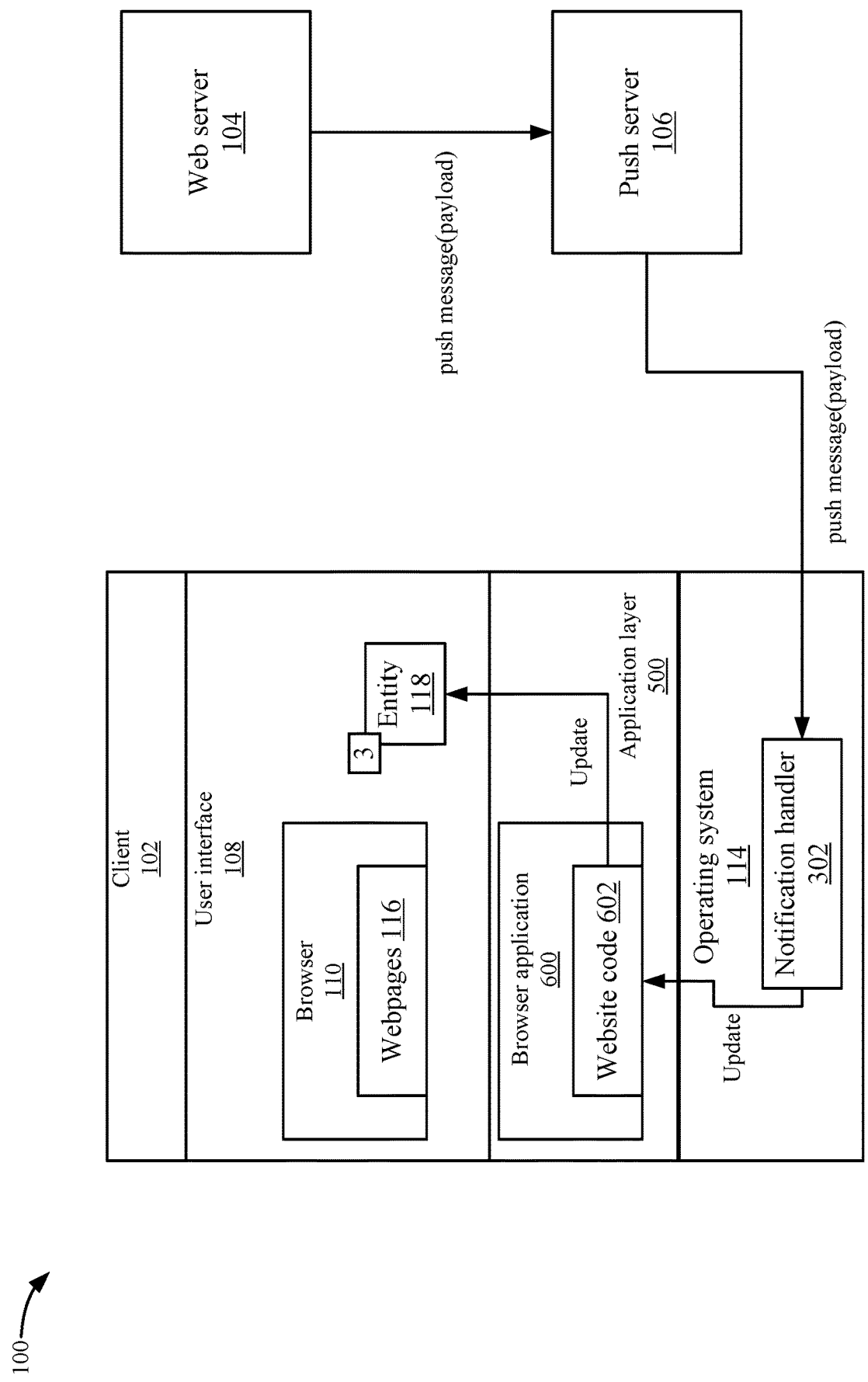
FIG. 6 depicts an example of using a browser to perform the updates according to some embodiments.

In another implementation, browser 110 may perform the update. FIG. 6 depicts an example of using browser 110 to perform the updates according to some embodiments. For example, notification handler 302 may send the update to a browser application 600. Browser application 600 may be a process running in application layer 500 and is configured to display browser 110 in user interface 108. Website 120 also includes website code 602 that can be downloaded from web server 104 and is used to display webpages 116.

Notification handler 302 sends the update and website code 602 can then execute code that updates the notification for entity 118. This operation requires that browser 110 be open. Also, webpage 116 may need to be open in browser 110 to perform the update. In other examples, if webpage 116 is not open in browser 110, operating system 114 may launch webpage 116 when the update is received. In another example, operating system 114 may launch browser 110 and open webpage 116 when the update is received.

Conclusion

Some embodiments allow updates to entities 118 that were previously unable to receive updates. The process configures a push channel that has entity 118 as the endpoint. Then, operating system 114 can process the push message updates and generate the notification on entity 118 without having to execute any application code. Some embodiments enable additional functionality for entity 118, such as allowing badge updates when a website is pinned to a task bar. The use of the notification may cause the user to access the website more frequently. Additionally, the notification may provide useful information for a website that may be a favorite of the user. The notification thus improves the user interface 108 by enhancing the functionality of entity 118 and providing additional information to the user.

Using operating system 114 to process the push channels may efficiently use computing resources and battery power of client 102. For example, code for webpage 116 does not need to be executed to perform the update of the notification. Further, browser 110 and webpage 116 do not need to be running to have the update be performed because the endpoint of the push channel is entity 118. This is useful to a user because the user may have pinned webpage 116 to the task bar, which separates entity 119 from webpage 116 and browser 110. If the running of browser 110 and website 120 are required, then the usefulness of entity 118 being pinned to the task bar may be minimized. The integration with operating system 114 increases the utility of providing the notification for entity 118.

Example Computer System

Figure 7:
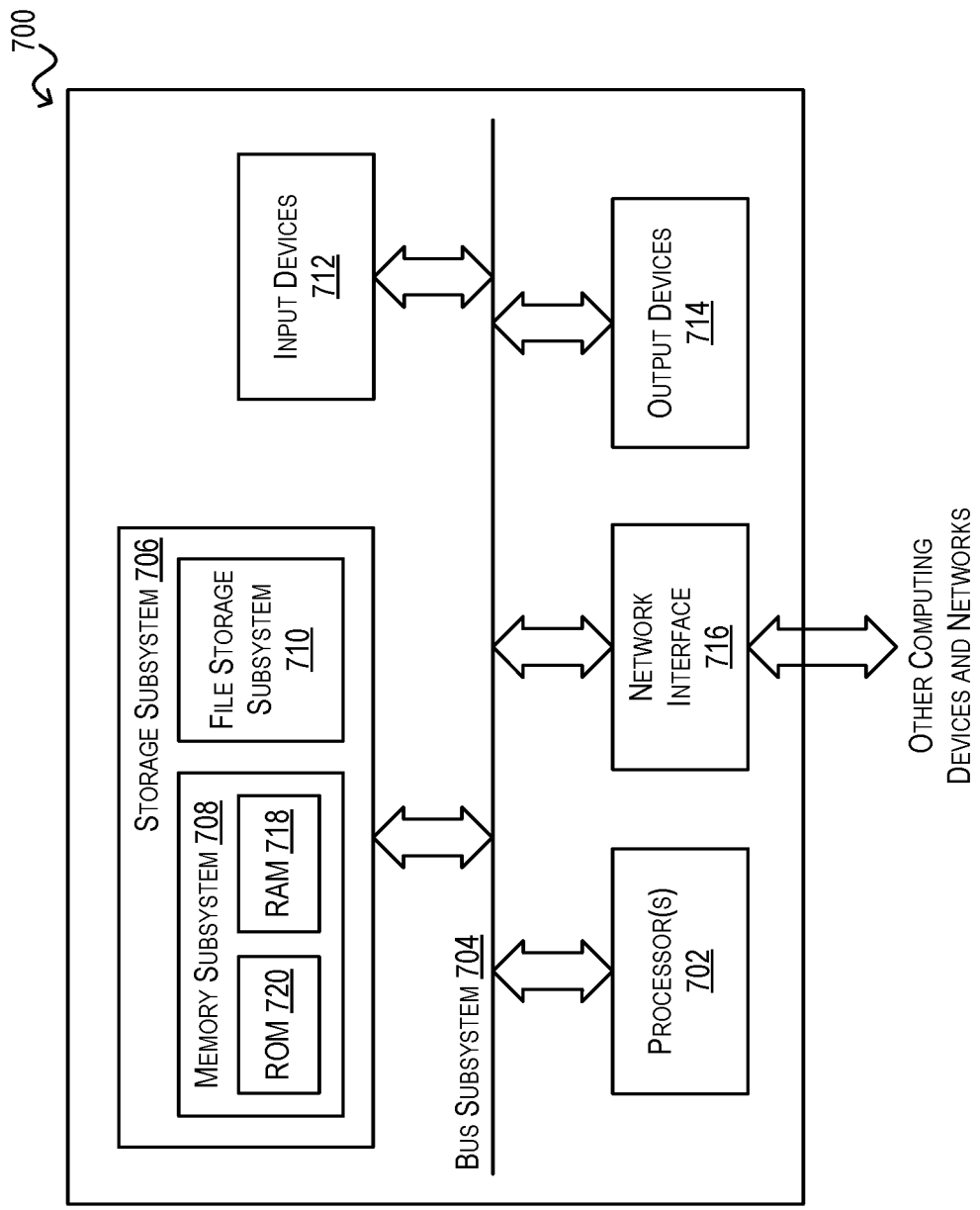
FIG. 7 depicts a simplified block diagram of an example computer system according to certain embodiments.

FIG. 7 depicts a simplified block diagram of an example computer system 700 according to certain embodiments. Computer system 700 can be used to implement any of the computing devices, systems, or servers described in the foregoing disclosure. As shown in FIG. 7, computer system 700 includes one or more processors 702 that communicate with a number of peripheral devices via a bus subsystem 704. These peripheral devices include a storage subsystem 706 (comprising a memory subsystem 708 and a file storage subsystem 710), user interface input devices 712, user interface output devices 714, and a network interface subsystem 716.

Bus subsystem 704 can provide a mechanism for letting the various components and subsystems of computer system 700 communicate with each other as intended. Although bus subsystem 704 is shown schematically as a single bus, alternative embodiments of the bus subsystem can utilize multiple buses.

Network interface subsystem 716 can serve as an interface for communicating data between computer system 700 and other computer systems or networks. Embodiments of network interface subsystem 716 can include, e.g., an Ethernet card, a Wi-Fi and/or cellular adapter, a modem (telephone, satellite, cable, ISDN, etc.), digital subscriber line (DSL) units, and/or the like.

User interface input devices 712 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 700.

User interface output devices 714 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 700.

Storage subsystem 706 includes a memory subsystem 708 and a file/disk storage subsystem 710. Subsystems 708 and 710 represent non-transitory computer-readable storage media that can store program code and/or data that provide the functionality of embodiments of the present disclosure.

Memory subsystem 708 includes a number of memories including a main random access memory (RAM) 718 for storage of instructions and data during program execution and a read-only memory (ROM) 720 in which fixed instructions are stored. File storage subsystem 710 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and many other configurations having more or fewer components than system 700 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
   a processor; and
   a computer readable storage medium having stored thereon program code that, when executed by the processor, causes the processor to:
   receive a signal to associate a website with an entity on a user interface, the website being run in an application and the entity running separately from the application in the user interface, wherein the entity is saved to a location on the user interface and is managed by an operating system running on the computer system;
   notify, by the operating system, the application that the entity has been assigned to the location;
   in response to the application receiving the notification, receive, by the operating system, a request from the application to retrieve metadata for the entity that includes a location identifier for the website and an interface to use to establish a push channel;
   receive, using the interface to use to establish the push channel, a request to associate the entity with the push channel that is configured to push updates from the location identifier for the website, wherein an entity identifier used by the operating system for the entity is used to configure the entity as an endpoint for the push channel;
   receive an update via the push channel at the operating system;
   associate the update with the entity by correlating the endpoint of the push channel to the entity identifier for the entity; and
   cause a notification to be output for the entity at the location on the user interface using the operating system.

2. The computer system of claim 1, wherein causing the notification to the be output for the entity comprises:
   process the update at an operating system level; and
   send the update to the entity to output the notification from the operating system level.

3. The computer system of claim 2, wherein the processing of the update and the sending of the update is performed without executing software code for the website.

4. The computer system of claim 2, wherein the processing of the update and the sending of the update is performed without executing software code for the application running on the operating system.

5. The computer system of claim 2, wherein the processing of the update and the sending of the update is performed without the website being open in the application.

6. The computer system of claim 1, wherein causing the notification to be output for the entity comprises:
   send the update to a service worker running at an application level, wherein the service worker sends updates the entity to output the notification.

7. The computer system of claim 1, wherein causing the notification to be output for the entity comprises:
   send the update to the application running the website at an application level, wherein the website updates the entity to output the notification.

8. The computer system of claim 1, further configured for:
   send a push channel request to a web server that is running the website to send updates for the website for the push channel, the push channel request indicating the entity identifier for the entity is the endpoint for the push channel.

9. The computer system of claim 1, wherein the update is received from a push server that is configured to receive the update from the website and configured to send the update via the push channel to the computer system.

10. The computer system of claim 1, wherein receiving the signal to associate the website with the entity on the user interface comprises:
    receive a selection of a menu on the application that is displaying the website to associate the website with the entity on the user interface.

11. The computer system of claim 1, wherein receiving the signal to associate the website with the entity on the user interface comprises:
    automatically associate the website with the entity on the user interface.

12. The computer system of claim 1, wherein associating the update with the entity by correlating the push channel to the entity comprises:
    determine the entity identifier for the endpoint of the push channel from the update; and
    correlate the entity identifier for the endpoint to the entity identifier for the entity.

13. The computer system of claim 1, wherein the entity is pinned to the location of the user interface and selection of the entity accesses the web site.

14. The computer system of claim 1, wherein the entity is associated with a display-less user interface and the notification is output verbally.

15. The computer system of claim 1, wherein:
    the update includes a payload; and
    the notification outputs a badge that displays information associated with the payload for the update.

16. The computer system of claim 1, wherein the push channel is configured with the entity as the endpoint by executing an application programming interface from the web site.

17. A method comprising:
    receiving, by a computing device, a signal to associate a website with an entity on a user interface, the website being run in an application and the entity running separately from the application in the user interface, wherein the entity is saved to a location on the user interface and is managed by an operating system running on the computer system;

notifying, by the operating system of the computing device, the application that the entity has been assigned to the location;

in response to the application receiving the notification, receiving, by the operating system of the computing device, a request from the application to retrieve metadata for the entity that includes a location identifier for the website and an interface to use to establish a push channel;

receiving, by the computing device, using the interface to use to establish the push channel, a request to associate the entity with the push channel that is configured to push updates from the location identifier for the website, wherein an entity identifier used by the operating system for the entity is used to configure the entity as an endpoint for the push channel;

receiving, by the computing device, an update via the push channel at the operating system;

associating, by the computing device, the update with the entity by correlating the endpoint of the push channel to the entity identifier for the entity; and causing, by the computing device, a notification to be output for the entity at the location on the user interface using the operating system.

18. The method of claim 17, wherein associating the update with the entity by correlating the push channel to the entity comprises:

determine the entity identifier for the endpoint of the push channel from the update; and correlate the entity identifier for the endpoint to the entity identifier for the entity.

19. The method of claim 17, wherein:

the update includes a payload; and the notification outputs a badge that displays information associated with the payload for the update.

20. A non-transitory computer readable storage medium having stored thereon program code executable by a computer system, the program code causing the computer system to:

receive a signal to associate a website with an entity on a user interface, the website being run in an application and the entity running separately from the application in the user interface, wherein the entity is saved to a location on the user interface and is managed by an operating system running on the computer system;

notify, by the operating system, the application that the entity has been assigned to the location;

in response to the application receiving the notification, receive, by the operating system, a request from the application to retrieve metadata for the entity that includes a location identifier for the website and an interface to use to establish a push channel;

receive, using the interface to use to establish the push channel, a request to associate the entity with the push channel that is configured to push updates from the location identifier for the website, wherein an entity identifier used by the operating system for the entity is used to configure the entity as an endpoint for the push channel;

receive an update via the push channel at the operating system;

associate the update with the entity by correlating the endpoint of the push channel to the entity identifier for the entity; and cause a notification to be output for the entity at the location on the user interface using the operating system.

* * * * *